United States Patent
Fuhrmann

(10) Patent No.: US 9,517,576 B2
(45) Date of Patent: Dec. 13, 2016

(54) METHOD AND APPARATUS FOR BENDING LED LIGHT GUIDES

(71) Applicant: KIEFFER & CO., INC, Sheboygan, WI (US)

(72) Inventor: Jeffrey M Fuhrmann, Howards Grove, WI (US)

(73) Assignee: KIEFFER & CO., INC., Sheboygan, WI (US)

( * ) Notice: Subject to any disclaimer, the term of this patent is extended or adjusted under 35 U.S.C. 154(b) by 377 days.

(21) Appl. No.: 14/053,024

(22) Filed: Oct. 14, 2013

(65) Prior Publication Data

US 2015/0102203 A1    Apr. 16, 2015

(51) Int. Cl.
| | |
|---|---|
| B29C 33/40 | (2006.01) |
| B29C 33/00 | (2006.01) |
| B29C 53/84 | (2006.01) |
| B29C 53/08 | (2006.01) |
| B29L 11/00 | (2006.01) |

(52) U.S. Cl.
CPC ............ *B29C 33/405* (2013.01); *B29C 33/00* (2013.01); *B29C 53/083* (2013.01); *B29C 53/84* (2013.01); *B29K 2883/00* (2013.01); *B29L 2011/0075* (2013.01)

(58) Field of Classification Search
CPC ........ B29C 33/405; B29C 33/40; B29C 33/00; B29C 53/083; B29C 53/84; B29C 53/005; B29C 53/08; B29C 53/086; B29C 53/00; B29C 53/80; B29C 61/10; B29C 63/04; B29C 66/432; B29L 2011/0075; B29K 2883/00

USPC ....... 249/134, 117, 153, 179; 264/1.24, 285, 264/295, 339, 219, 2.5; 425/175; 362/249.02, 362/249.04

See application file for complete search history.

(56) References Cited

U.S. PATENT DOCUMENTS 6,087,635 A * 7/2000 Reinbold .............. B29C 53/083
                                                         219/396
6,257,864 B1 * 7/2001 Roberts ................. B29B 13/024
                                                         264/339

FOREIGN PATENT DOCUMENTS

GB            1374287 A    * 11/1974  ............. B29C 49/00

* cited by examiner

*Primary Examiner* — James Sanders
*Assistant Examiner* — Leith S Shafi
(74) *Attorney, Agent, or Firm* — Oblon, McClelland, Maier & Neustadt, L.L.P.

(57) ABSTRACT

An article of manufacture includes a jig including a flat surface with a curved groove therein; a light guide located within the curved groove, the light guide including an internal groove; and a bend-aid located in the internal groove of the light guide.

17 Claims, 7 Drawing Sheets

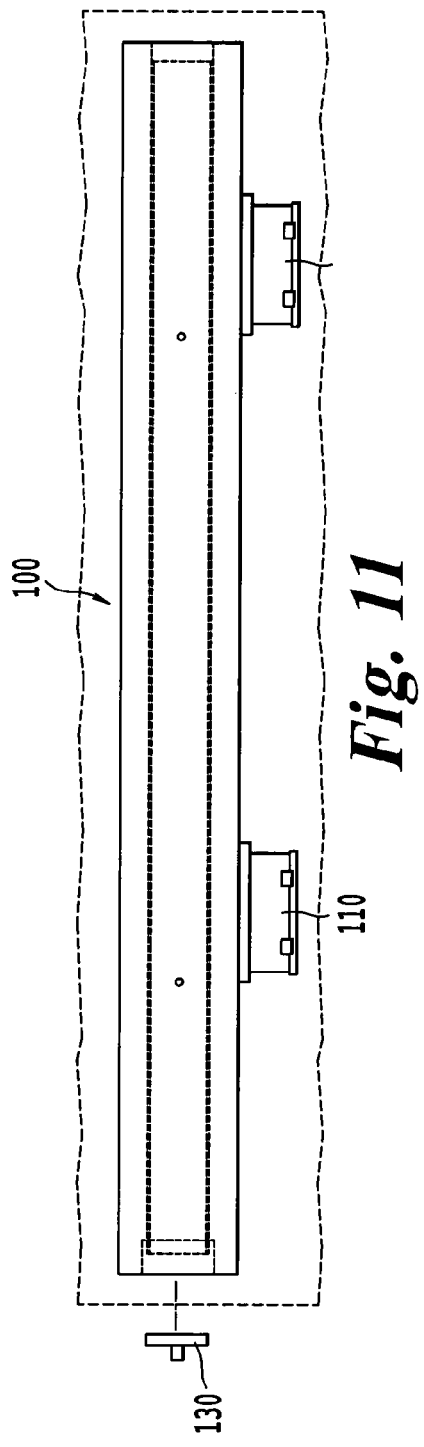
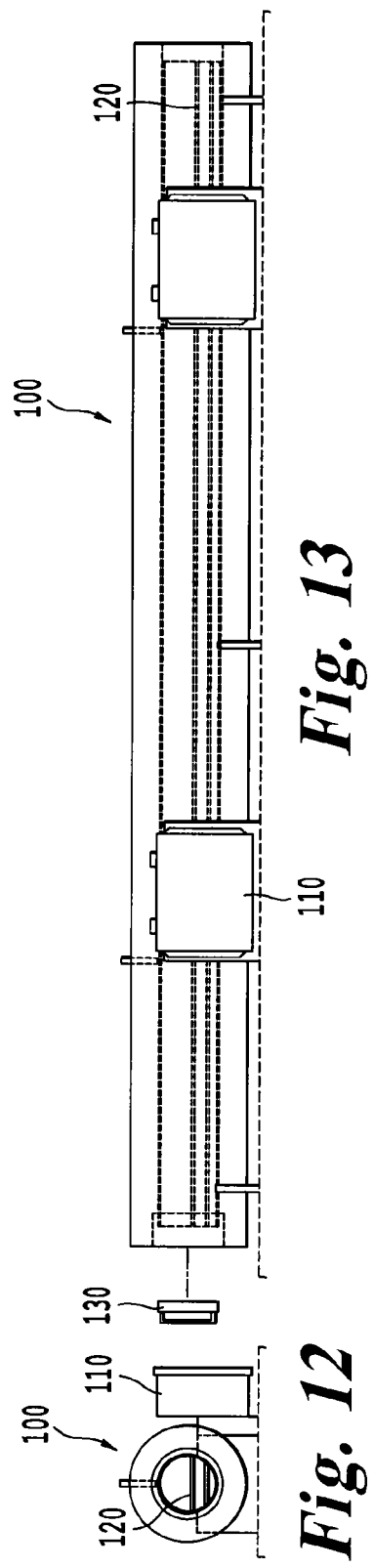

METHOD AND APPARATUS FOR BENDING LED LIGHT GUIDES

BACKGROUND OF THE INVENTION

Field of the Invention

The present invention is related to methods and apparatuses for bending light guides for guiding light emitted by light emitting diodes (LEDs).

Description of the Related Art

Glass tubes filled with neon gas have been used to provide decorative, colored lights. For example, U.S. Pat. No. 5,001,613 describes a housing to protect neon tube lights. This is necessary because the glass tubes are fragile. Further, neon tube lights are difficult and costly to manufacture. Finally, neon tube lights consume a significant amount of power, and thus are costly to keep lit. Accordingly, alternative decorative lighting devices were desired.

The invention of LEDs allowed a low cost alternative to neon lighting. With regard to the power consumed, LEDs consume only 10% or less of a comparable neon tube light. However, the light from an LED needs to pass through a light guide to provide the same effect as a neon tube. To provide the same versatility as neon tubes, the light guides need to be able to be formed into a plurality of shapes, especially lettering. Conventionally, this has been done by heating a plastic light guide with a heat gun and then bending the hot light guide. However, this process is time consuming, difficult to repeat, and cannot provide light guides with a radius of curvature comparable to neon tubes.

SUMMARY OF THE INVENTION

The present invention broadly comprises a method and apparatuses for bending LED light guides. In one embodiment, an article of manufacture includes a jig including a flat surface with a curved groove therein; a light guide located within the curved groove, the light guide including an internal groove; and a bend-aid located in the internal groove of the light guide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11 shows a top view of an oven according to one embodiment of the present invention;

FIG. 12 shows a front view of an oven according to one embodiment of the present invention; and FIG. 13 shows a side view of an oven according to one embodiment of the present invention.

DETAILED DESCRIPTION OF THE PREFERRED EMBODIMENTS

Figure 1:
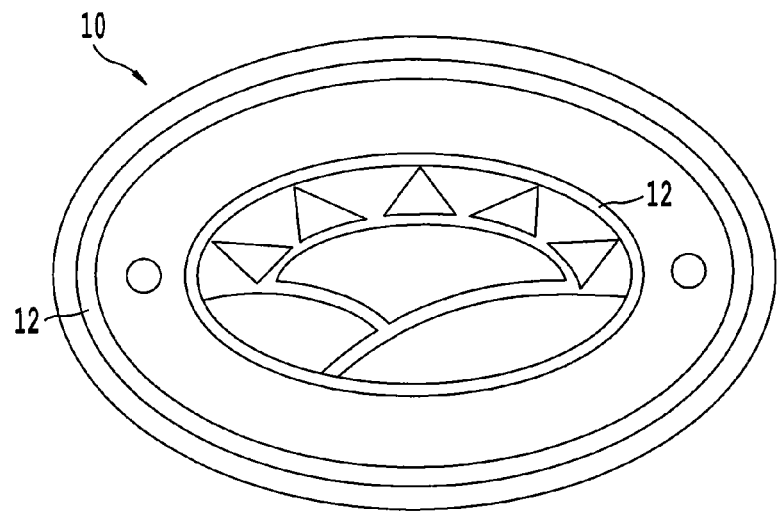
FIG. 1 shows a desired pattern for a lighting unit including LED light guides according to the present invention.

Referring now to the drawings, wherein like reference numerals designate identical or corresponding parts throughout the several views.

The present invention includes a method and apparatuses for bending LED light guides. An exemplary method for bending LED light guides will now be explained with reference to FIGS. 1-9.

Figure 2:
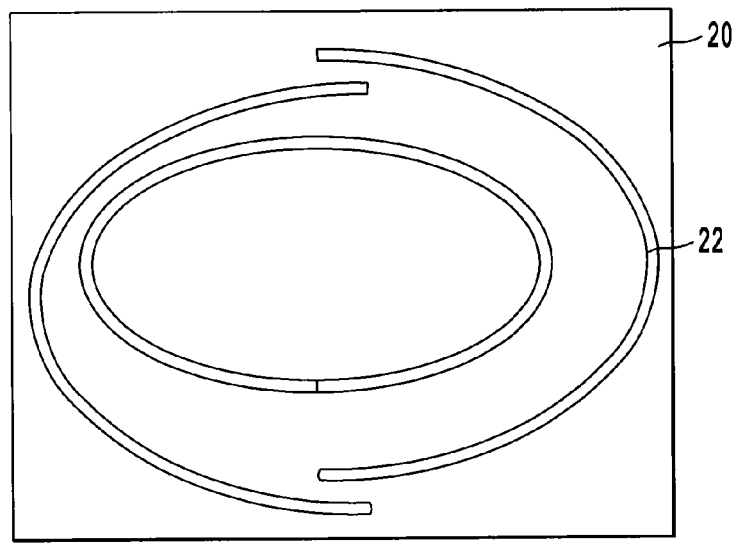
FIG. 2 shows a jig used to bend LED light guides.

FIG. 1 shows a pattern 10 for a desired lighting unit. The pattern includes lighting portions 12 which will be made of LED light guides with LEDs installed therein. Based on the pattern, a jig 20, shown in FIG. 2, is created. Jig 20 includes grooves 22 which correspond to the lighting portions 12 of the pattern 10. In one embodiment, grooves 22 are cut with a router in a surface such as a 0.75 inch thick board, and have a width slightly greater than the desired LED light guide. In one embodiment, the LED light guides are 19/32 inches wide.

The LED light guides are cut to be the same length as grooves 22. According to the present invention, grooves 22 may have a radius of curvature as small as 5/8 inches. In contrast, using a heat gun can only achieve a minimum radius of curvature of 1.25 inches. This allows light guides in the shapes of letters or numbers having a font size of approximately 10 inches tall to be created in accordance with the present invention. This is a dramatic improvement over letters or numbers made with a heat gun, which need to be at least 18-20 inches tall due to the greater minimum radius of curvature.

Figure 3:
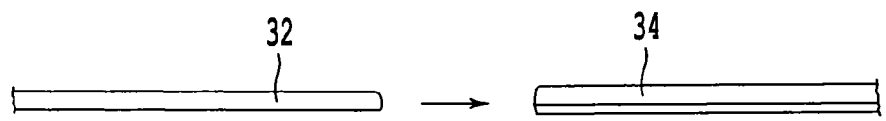
FIG. 3 shows a bend-aid being inserted into a light guide according to the present invention.
Figure 4:
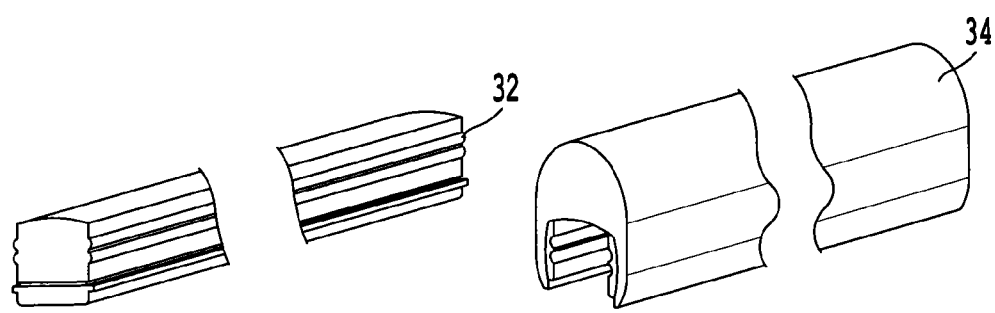
FIG. 4 shows the cross sections of an exemplary bend-aid and light guide.

As shown in FIG. 3, bend-aid 32 is inserted into the internal groove in LED light guide 34. As shown in FIG. 4, bend-aid 32 is approximately the size of the groove in LED light guide 34. In one embodiment, bend-aid 32 is 13/32 inches wide and 7/16 inches tall. In this embodiment, the groove in LED light guide 34 has these same dimensions. The bend-aid 32 may have the same length as LED light guide 34, or may include multiple bend-aids 32 such that substantially the entire groove in LED light guide 34 is occupied by a bend-aid 32.

As shown in FIG. 4, LED light guide 34 has a U-shape. In the embodiment shown in FIG. 4, the thickness of a bottom portion of the U is greater than the thickness of the arms of the U. In one embodiment, the thickness of the bottom portion of the U is 17/64 inches and the thickness of the arms of the U is 3/32 inches. Also as shown in FIG. 4, in some embodiments the bottom portion of the light guide 34 is curved. In other embodiments, the bottom may be flat.

Also, in some embodiments the light guide 34 is made of plastic and the bend-aid 32 is made of silicone. The bend-aid 32 provides support to the walls of light guide 34 when the light guide is being bent so that the internal groove of the light guide does not deform or collapse due to the bending.

Figure 5:
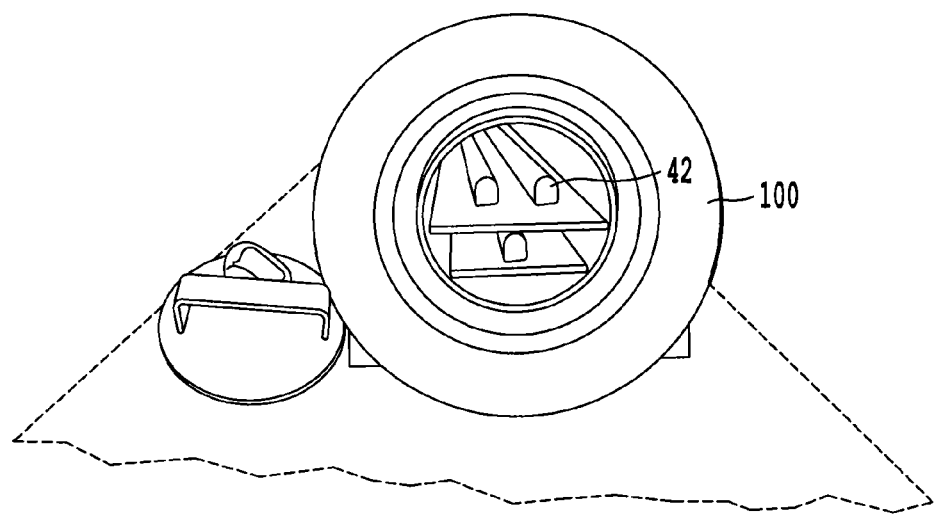
FIG. 5 shows the combined bend-aid and light guide being heated in an oven.

As noted above, bend-aid 32 is inserted into the groove in light guide 34 such that substantially the entire groove is filled with bend-aid 32 to form a combined bending element 42. As shown in FIG. 5, combined bending element 42 is then placed in an oven 100. In one embodiment, oven 100 is maintained at 325° F., and combined bending element 42 is heated in the oven for 15 minutes. In the embodiment shown in FIG. 5, the flat portion of the combined bending element 42 is placed down, such that the bend-aid 32 is facing the shelf of the oven 100.

Figure 6:
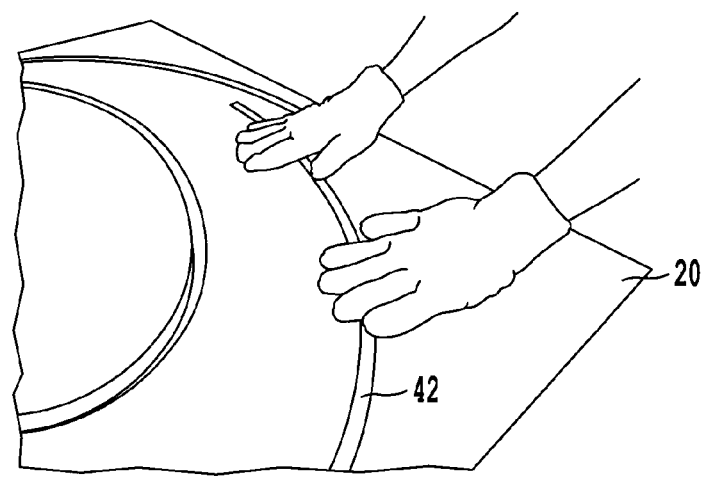
FIG. 6 shows the heated combined bend-aid and light guide being inserted in grooves of the jig.
Figure 7:
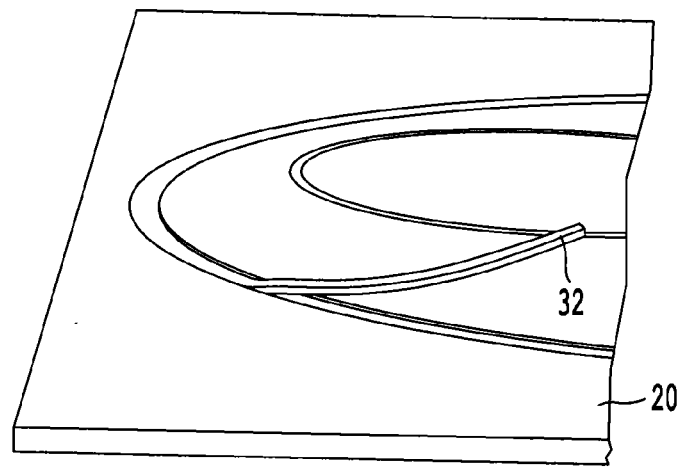
FIG. 7 shows the bend-aid being removed from the light guide while the light guide remains in the jig.

After combined bending element 42 is heated for a sufficient period of time, it is removed from oven 100. As shown in FIG. 6, combined bending element 42 is then placed into groove 22 of jig 20. In the embodiment shown in FIG. 6, combined bending element 42 is inserted such that the flat portion of the combined bending element 42 is facing up. After combined bending element 42 cools for a period of time, bend-aid 32 is removed from the groove in light guide 34, as shown in FIG. 7. Light guide 34 is not removed from groove 22 at this time. After a further cooling time, light guide 34 is removed from groove 22.

Figure 8:
FIG. 8 shows an LED being inserted into the light guide.
Figure 9:
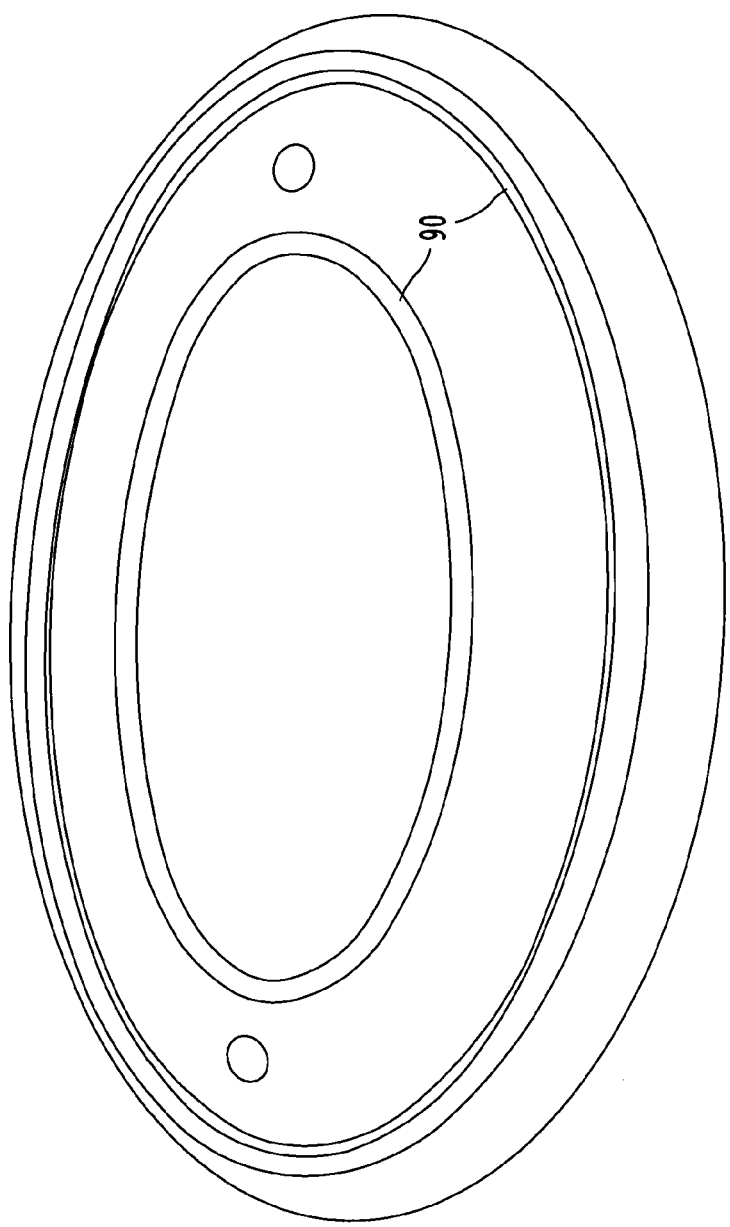
FIG. 9 shows the completed lighting unit.
Figure 10:
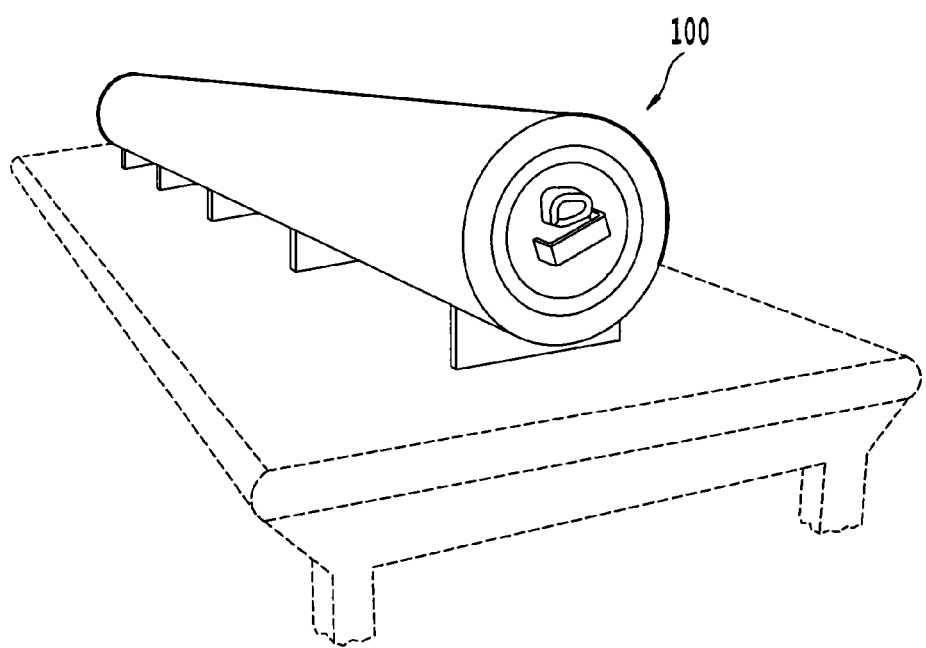
FIG. 10 shows a perspective view of an oven according to one embodiment of the present invention.

As shown in FIG. 8, LED 52 is then inserted into the groove in light guide 34 to create lighting element 90. As shown in FIG. 9, lighting element 90 is then installed onto the lighting fixture.

FIGS. 10-13 illustrate an oven 100 used with the invention. Oven 100 includes a door 130, shelves 120 to support the combined bending elements 42, and control electronics 110. The control electronics 110 may include a proportional/integral/derivative (PID) controller to maintain the oven temperature at a set level. As noted above, in one embodiment the temperature is set at 325° F. Oven 100 also extends a length much greater than its width or height. In one embodiment, oven 100 is 8.5 feet long. In this exemplary embodiment, an upper shelf is 4 11/16 inches wide and a lower shelf is 3.5 inches wide. The upper shelf is set 2.125 inches from the bottom of the oven in the lower shelf is set 1 inch from the bottom of the oven. The oven has a circular cross-section with a diameter of 4.625 inches.

Obviously, numerous modifications and variations of the present invention are possible in light of the above teachings. It is therefore to be understood that within the scope of the appended claims, the invention may be practiced otherwise than as specifically described herein.

The invention claimed is:

1. A kit for bending a light guide, comprising:
   a jig including a flat surface with a curved groove therein;
   the light guide located within the curved groove, the light guide including an internal groove; and
   a bend-aid located in the internal groove of the light guide.

2. The kit according to claim 1, wherein the light guide has a U-shape and the bend-aid is located between arms of the U-shape.

3. The kit according to claim 1, wherein the light guide is made of plastic.

4. The kit according to claim 1, wherein the bend-aid is made of silicone.

5. The kit according to claim 1, wherein a radius of curvature of the curved groove is between 0.625 and 1.25 inches.

6. The kit according to claim 5, wherein the radius of curvature of the curved groove is 0.625 inches.

7. The kit according to claim 1, wherein a length of the light guide is equal to a length of the curved groove.

8. The kit according to claim 1, wherein a length of the light guide is equal to a length of the bend-aid.

9. The kit according to claim 1, wherein a plurality of bend-aids are located in the internal groove of the light guide.

10. The kit according to claim 1, wherein the internal groove of the light guide faces a same direction as the groove of the jig.

11. The kit according to claim 1, wherein a surface of the light guide opposite the internal groove is a curved surface.

12. The kit according to claim 1, wherein the groove of the jig has a shape of a letter or number.

13. The kit according to claim 1, wherein the groove of the jig has the shape of the letter or number with a height between 10 to 18 inches.

14. The kit according to claim 13, wherein the groove of the jig has the shape of the letter or number with the height of 10 inches.

15. The kit according to claim 1, wherein the kit is inside a housing of an oven, the housing surrounding a heating cavity, the housing having a length more than 16 times a width of the housing and more than 16 times a height of the housing, and the oven including control circuitry configured to maintain the heating cavity at a fixed temperature.

16. The kit according to claim 1, wherein the bend-aid fills an entirety of the internal groove of the light guide.

17. The kit according to claim 1, wherein the light guide is located within the curved groove with an opening of the internal groove of the light guide facing an opening of the curved groove, so that the bend-aid is removable from the internal groove of the light guide while the light guide remains within the curved groove.

* * * * *